United States Patent [19]
McCoy

[11] 3,762,959
[45] Oct. 2, 1973

[54] SECONDARY BATTERY WITH MOVABLE SHUTTER MEANS BETWEEN FIXED ELECTRODES

[75] Inventor: Lowell R. McCoy, Woodland Hills, Calif.

[73] Assignee: Rockwell International Corporation, El Segundo, Calif.

[22] Filed: Mar. 29, 1971

[21] Appl. No.: 129,089

[52] U.S. Cl. .............................................. 136/141
[51] Int. Cl. ........................................... H01m 31/02
[58] Field of Search............ 136/141, 140, 159–161, 136/6, 28, 30, 86, 75–76

[56] References Cited
UNITED STATES PATENTS

| | | | |
|---|---|---|---|
| 543,680 | 7/1895 | Epstein | 136/141 |
| 3,440,098 | 4/1969 | Stachurski | 136/6 |
| 717,395 | 12/1902 | Halsey | 136/140 |
| 734,547 | 7/1903 | Halsey | 136/141 |
| 3,257,241 | 6/1966 | Tamminen | 136/90 |
| 3,275,475 | 9/1966 | Cohn et al. | 136/86 E |
| 3,359,136 | 12/1967 | Merten et al. | 136/30 X |
| 3,560,261 | 2/1971 | Stachurski et al. | 136/141 |
| 734,857 | 7/1903 | Halsey | 136/140 |

*Primary Examiner*—Anthony Skapars
*Attorney*—L. Lee Humphries, Thomas S. MacDonald and Henry Kolin

[57] ABSTRACT

An electrically regenerable electrochemical system has a rotating apertured shutter between fixed negative and positive electrodes which provides both electrolyte circulation and pulsed charging to form deposits on the electrodes during the charge mode of the repeated charge and discharge cycles that are smooth, uniform and adherent. A zinc-nickel oxide secondary battery of this system is uniquely suited for use in hybrid vehicular power systems because of its ability to provide long cycle life at very high power densities under conditions of rapid cycling.

7 Claims, 2 Drawing Figures

PATENTED OCT 2 1973          3,762,959

INVENTOR.
LOWELL R. McCOY

BY Henry Kolin

ATTORNEY

SECONDARY BATTERY WITH MOVABLE SHUTTER MEANS BETWEEN FIXED ELECTRODES

BACKGROUND OF THE INVENTION

This invention relates to an improved electrically regenerable electrochemical system. It more particularly relates to a zinc-nickel oxide secondary battery providing long cycle life at very high power densities under conditions of rapid cycling.

The present electrically regenerable electrochemical system by providing a long cycle life at high power densities finds particular utility in a hybrid vehicular power system. Such a hybrid system consists of a conventional heat engine, such as an internal combustion engine, coupled with a secondary battery, and is intended to substantially reduce the amount of air pollutants emitted when a heat engine alone is used as power source. The battery used in a hybrid system needs to store only a relatively small amount of energy for utilization during limited periods of high-power demand, such as during vehicle acceleration. Thus the energy-density-requirements for batteries for use in a hybrid vehicle are less critical than those of batteries required for use in all-electric vehicles. On the other hand, rapid cycling at high current levels in charge and discharge modes of but several seconds or minutes duration requires that the batteries used for hybrid systems possess very long cycle lives of at least several thousand cycles and provide exceptionally high power densities in excess of 100 watts per pound. While an improved electrically regenerable electrochemical system may be made utilizing a large variety of different negative and positive electrodes cooperating with the movable shutter means, this system will be particularly described with respect to an improved secondary battery using a zinc-nickel oxide alkaline electrochemical system because of the particular utility of such a battery in a hybrid vehicle.

The unique position of zinc as a negative electrode for use in electric cells and batteries has long been recognized because zinc is cheap, abundant, has a low rate of self-discharge in alkaline electrolytes, and has a high energy density when used in combination with common counterelectrodes. For these reasons, it is used extensively in primary batteries. It is also attractive for use in secondary batteries as it provides the highest energy density of the metals that can be electrodeposited from an inexpensive, highly conductive aqueous electrolyte at ambient temperatures. However, the use of zinc electrodes in secondary batteries has been severely limited by their failure to withstand repeated cycling at high charge and discharge rates and by the limited depth of discharge that can be achieved without an irreversible loss of capacity. In particular, repeated recharge of these zinc electrodes leads to undesirable changes in the electrode structure. Thus a frequent mode of failure has consisted in the formation of non-adherent mossy and dendritic deposits instead of smooth adherent deposits. The nonadherent mossy deposit, which is black, fluffy and porous, is formed at low overpotentials; whle the dendritic deposits are formed at high overpotentials.

Many attempts have been made to overcome these problems encountered in the attempted use of zinc electrodes in secondary batteries. Some of these approaches have involved utilizing a porous electrode structure, circulating the electrolyte, and using rotating planar electrodes. See, for example, U. S. Pat. Nos. 3,359,136; 3,275,475; and 3,440,098 in which are described some of the problems encountered in using an electrochemically reversible electrode, particularly a zinc/zinc oxide electrode subjected to charge-discharge cycling. In U. S. Pat. No. 3,440,098, it is proposed to overcome the development of dendritic deposits, which tend to bridge the interelectrode gap between the reversible electrode and the counterelectrode thereby shorting the cell, by using a rotating wiper member for sweeping the face of the active electrode. It has also been proposed to use an electrically pulsed current source or periodic reversal of current during the charging cycle.

While the foregoing techniques may provide partial solutions for one or another of the various problems encountered in devising high performance electrodes suitable for use in secondary batteries, to date they have been unable to provide secondary batteries of commercial interest that are capable of extended cycling at high charge-discharge rates. The electrically regenerable electrochemical system provided by this invention, particularly when utilized as a rechargeable zinc-nickel oxide alkaline secondary cell or battery, provides for uniform and adherent deposition of the electrode materials during charge and discharge cycles and is capable of rapid cycling and long cycle life at very high power densities.

SUMMARY OF THE INVENTION

It is an object of the present invention to provide a unique electrically regenerable electrochemical system that has a long cycle life at high power densities. It is a further object of the invention to provide an improved zinc-nickel oxide secondary battery of particular utility in a hybrid vehicular power system.

In accordance with this invention, an electrically regenerable electrochemical system is provided wherein a nonconductive movable shutter means is disposed between, but not in contact with, fixed negative and positive electrodes immersed in an electrolyte. The shutter means is in continuous movement during operation of the cell during both charge and discharge cycles to provide stirring or circulation of the electrolyte and also to subject any given point on the electrode surface to a mechanical equivalent of pulsed charging, i.e., to alternating periods of maximum and minimum current density. Thereby uniform and adherent deposits are formed on the electrodes during the charge mode and electrode passivation is avoided during the discharge mode to provide a cell capable of undergoing long cycle life at high power densities.

In the preferred aspects of the invention, the nonconductive movable shutter means consists of a thin, rotating apertured or slotted disk. The apertures or slots generally consist of two or more open sectors, preferably having between 30 and 80 per cent open area so as to provide minimal resistance to the flow of current through the electrolyte during cell operation while still providing electrolyte agitation and pulsed-current charging. The rotational speed of the apertured disk is varied over wide limits, between 20 and 200 rpm, depending upon the ratio of open to closed spaces present in the disk. While any portion of either electrode may receive alternating periods of high and low current densities as low as one cycle per second to 10 cycles per second without loss of efficiency, it is generally more convenient and preferred to operate the cell to provide between 10 and 200 cycles per second. Representative hybrid vehicular power systems requirements call for a 10- to 30-second charge cycle, with a discharge cycle as low as 6 seconds and as high as 12 minutes. While rotational speeds up to 200 rpm may be utilized, from a practical standpoint it is preferred to keep the rotational speed as low as possible commensurate with providing adequate movement of the electrolyte so as to minimize the power losses involved in rotating the disk.

DESCRIPTION OF THE PREFERRED EMBODIMENTS

Figure 1:
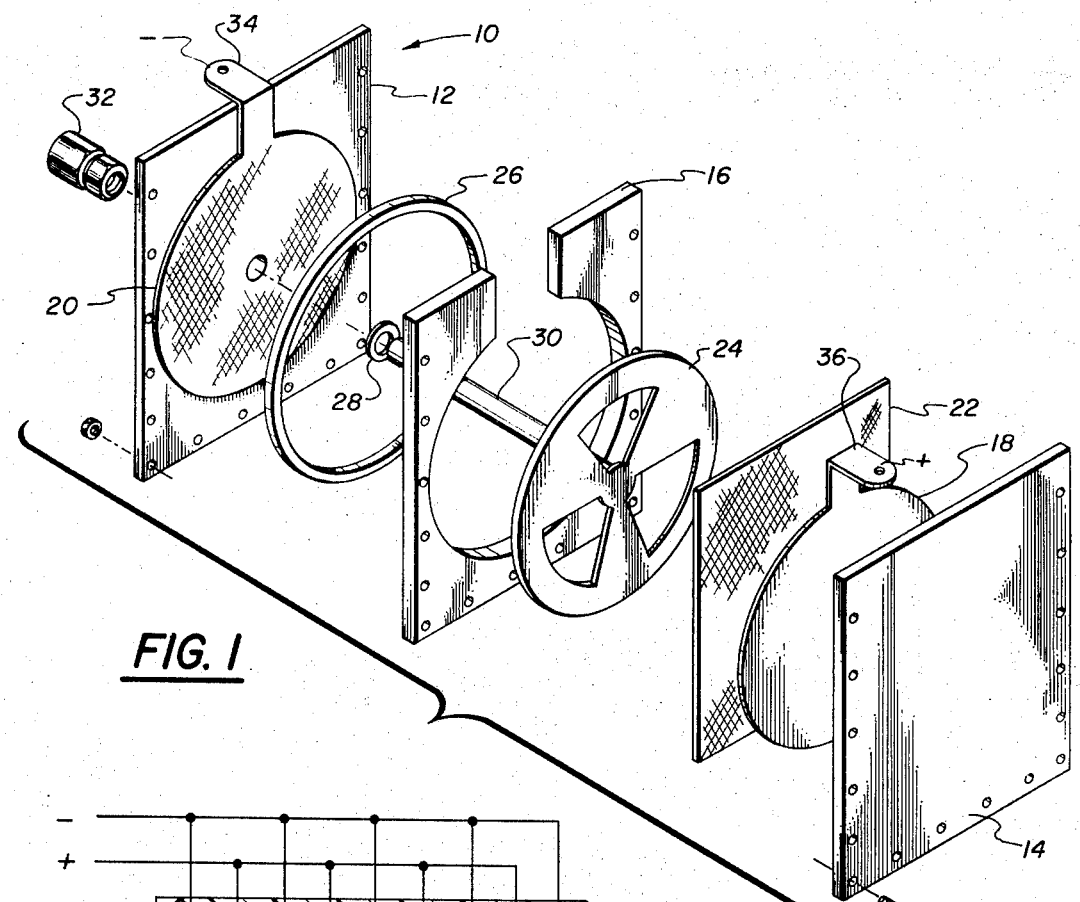
FIG. 1 is an exploded schematic view in perspective of a cell made in accordance with the present invention.

In its broadest aspects, the electrically regenerable electrochemical system of this invention may be advantageously utilized for many battery applications, particularly those requiring rapid cycling and long cycle life at very high power densities. This long cycle life is provided because of the smooth, uniform and adherent deposits formed on the electrodes during the charge mode. Such deposits are obtained by moving a nonconductive movable shutter means between the stationary negative and positive electrodes so that during operation of the cell, movement of the shutter means results in agitation of the electrolyte together with pulsed charging.

A wide variety of nonconductive movable shutter means may be utilized so as to expose portions of the fixed electrodes to alternating periods of varying current density during operation of the cell while at the same time providing circulation of the electrolyte. Thus a slotted planar mask may be oscillated in an upward and downward movement, with slots in the mask transverse to the direction of movement. However, such a shutter means would involve greater mechanical complexity since it would require changing direction of the moving mass at a desired frequency. Thus a thin, apertured or slotted rotating disk is preferred because of its simplicity of construction and the minimal power requirements for rotating the disk in a single direction at a given frequency while at the same time providing the desired electrolyte agitation and pulsed charging of the electrodes. In general, the particular type and arrangement of apertures in the disk in the form of variously shaped slots, slits, holes or sectors is not considered critical, provided the amount of closed area of the rotating disk is not such as to unduly increase the internal resistance of the cell. Conversely, the amount of open area should not be such as to interfere with providing an effective mechanical equivalent of pulsed charging. In general, the open area will vary from 30 to 80 percent of the total disk area. The apertures are generally and preferably arranged in the form of symmetrical sectors, anywhere from two to 10 such sectors being convenient and suitable. Thereby a uniform periodicity of the pulsed charging is obtained. The rotational speed of the apertured disk will of course be a significant factor in determining the rate of cyclical charging of the cell.

The total rate at which an electrochemical process takes place at an electrode surface is the product of the electrode surface area and the rate per unit area (current density). Because smooth, uniform and adherent deposits are formed on the stationary electrodes when utilizing the rotating shutter, it is feasible and desirable to increase the effective surface area by utilizing highly porous substrates on which the active electrode material is deposited. Thus metallic screens and porous plaques may be advantageously utilized as substrates so that for a given electrode surface area a higher effective current density is obtained during the charge and discharge cycles, thereby providing a considerable increase in the power density of the cell.

A wide variety of electrodepositable metals, e.g., Zn, Cd, Sn, Pb, may be employed as the active materials of the negative electrodes in the secondary cell. During the discharge cycle of the cell, these metals of the negative electrode are oxidized. On recharging the cell, these metals are redeposited on the negative electrode. As used herein, the term battery generally designates an assembly of substantially identical units or cells, but it may conveniently be used to designate only a single unit. Similarly, use of the term counterelectrode merely refers to an opposing electrode, whether utilized as a negative or positive electrode or as an anode or cathode.

Because of the relatively high energy density and power density that may be obtained with zinc, it is particularly preferred for use as the negative electrode of an alkaline secondary cell. Such an electrode may be employed with a wide variety of counterelectrodes, which may be chemically inert or be composed of electrochemically reversible materials. When the negative zinc electrode is used as an anode (discharge cycle) in a secondary cell, three cathodic materials are of particular interest for use therewith as counterelectrodes, namely, silver oxide, nickel oxide, and oxygen (or air). The conventional alkaline electrolyte used in such cells is generally between 20 and 40 wt. percent KOH.

The cell reaction for each of the foregoing systems can be written in idealized form as follows:

1a. $Ag_2O + Zn + H_2O \rightleftarrows 2Ag + Zn(OH)_2$
1b. $AgO + Zn + H_2O \rightleftarrows Ag + Zn(OH)_2$
2. $2NiOOH + Zn + 2H_2O \rightleftarrows 2 Ni(OH)_2 + Zn(OH)_2$
3. $\frac{1}{2}O_2 (air) + Zn + H_2O \rightleftarrows Zn(OH)_2$ The foregoing secondary battery systems are well known and each offers certain advantages and disadvantages under conditions of repeated cycling in terms of loss of active material, chemical irreversibility, obtainable energy and power density, cost, and reliability. Use of the rotating apertured shutter, particularly with respect to the zinc electrode, will provide an improvement for each of these secondary cell systems, particularly in providing improved cycle life under conditions of high current charge and discharge.

For purposes of illustration, because of its commercial importance in providing long cycle life at very high power densities, the invention will be particularly described in its various preferred embodiments with reference to a secondary cell consisting of the zinc-nickel oxide system, although clearly not limited thereto.

Referring to FIG. 1, an exploded schematic view in perspective of an electric cell 10 is shown, illustratively, a zinc-nickel oxide secondary cell. The insulated cell casing consists of end plates 12 and 14, suitably of polystyrene, with a gasket 16, suitably of rubber, used as a spacer to provide the necessary cell cavity. A positive nickel oxide electrode 18 is suspended loosely within the cell by its external current lead (not shown). A negative electrode 20 consists of a coating of zinc electrodeposited on a cadmium-plated copper screen. The zinc electrode support is affixed to cell end plate 12 by a suitable cement.

It is important that the negative electrode 20 be constructed or surfaced with a metal capable of receiving an adherent plate of the metal to be electrodeposited. For example, the deposition of zinc upon nickel generally produces nonadherent deposits if the nickel has been subjected to anodic treatment prior to such deposition. These nonadherent deposits may flake off or blister from the nickel causing shorting. Thus an underlying layer of cadmium is preferred for use as a substrate on which zinc is deposited to improve adherence of the zinc. In addition, it is preferred that negative electrode 20 be in perforated form, such as a screen. This improves the adherence of the deposited metal, increases the effective surface area, and provides a saving in weight.

Because of the loose suspension of the nickel oxide electrode 18, a 35-mesh nylon screen 22 is used to prevent direct contact between the nickel oxide electrode 18 and a rotating shutter 24. Screen 22 is generally of the same size, or slightly smaller, than electrode 18. Shutter 24 is in the form of an apertured disk, is made of a thin insulating plastic material, such as a high-impact-strength polystyrene, and is of the same of slightly larger diameter than electrodes 18 and 20. As shown, shutter 24 has three apertured sectors which provide an open area equal to that of the masked area. An annular spacer ring 26 and an inner spacer disk 28, both made of a suitable insulating plastic material such as nylon, are used to prevent contact between the rotating shutter 24 and the negative zinc electrode 20. Shutter 24 is fixedly mounted on a shaft 30 which extends through end plate 12 of the cell through a shaft bearing and seal 32, the shaft then being connected to a fixed-speed motor (not shown). Negative and positive current-conducting tabs 34 and 36, respectively, extend from the electrodes over the top of the cell walls and are attached to their respective lead wires (not shown).

Figure 2:
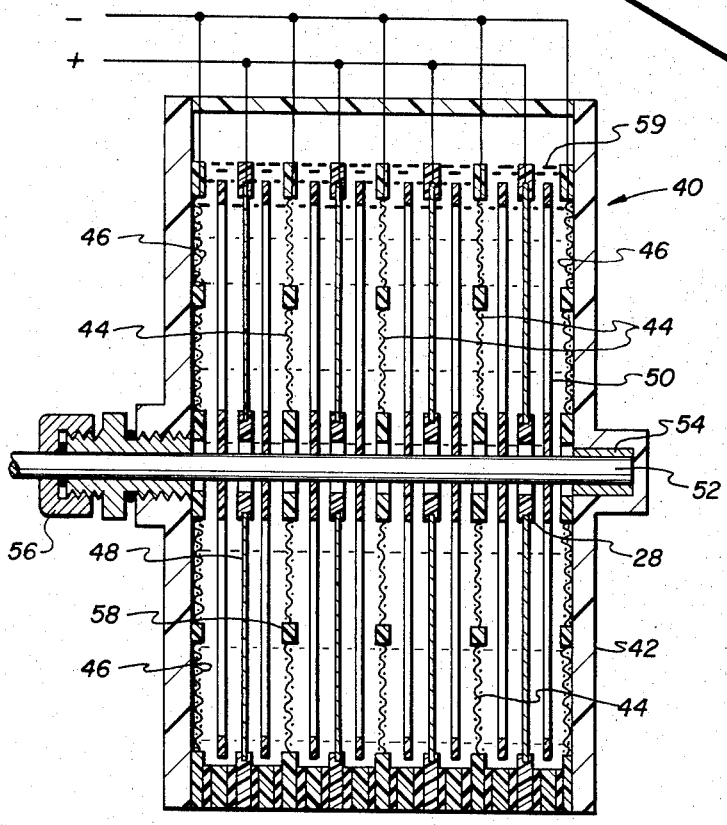
FIG. 2 is a cross-sectional schematic view of a secondary zinc-nickel oxide alkaline battery consisting of a battery module equivalent to eight electrode pairs connected in parallel.

In FIG. 2 is shown a cross-sectional schematic view of a secondary zinc-nickel oxide alkaline battery 40. The battery module shown is equivalent to eight pairs of zinc and nickel oxide electrodes connected in parallel. In order to maximize the power density available, lightweight materials of construction are used throughout. The cell casing 42 is preferably of polystyrene or polypropylene. The three inner zinc electrodes 44 are double-faced electrodes having zinc coatings on both sides. The outer zinc electrodes 46, which are attached to the opposite side walls of casing 42, are single-faced electrodes. These negative zinc electrodes 44 and 46 preferably consist of cadmium-plated copper screens having an electrodeposited zinc coating thereon. In place of the metal screens, cadmium-plated porous metal plaques or felt metal may be used as a base for the zinc coatings. All four nickel oxide electrodes 48 are double-faced electrodes. Conventional nickel oxide electrodes of pocket-type or preferably sintered plaque construction are suitably used. As shown, all of the zinc electrodes 44 and 46 are connected in parallel; similarly, all of the nickel oxide electrodes 48 are connected in parallel. Eight rotating apertured shutters 50 are shown, a shutter being interposed between each electrode pair. These shutters consist of thin apertured disks, suitably of nylon, polystyrene, or polypropylene, and are of the same diameter or slightly larger than that of the electrodes. Shutters 50 are fixedly attached to a rotatable shaft 52 which rotates in a sleeve 54 and a shaft bearing and seal 56. A fixed-speed motor (not shown) is used to rotate the shaft. The motor suitably obtains its power from the battery when several of the modules shown are connected in series to provide the required voltage. Various insulated plastic spacers 58 are part of the structure of the zinc electrodes 44 and 46 so as to maintain the desired spaced-apart relationship between the zinc electrodes and the shutters, thereby preventing contact between these cell components. The cell is filled with a conventional alkaline electrolyte 59, suitably 35 wt percent KOH containing zinc oxide dissolved therein.

The module shown in FIG. 2 corresponds to eight parallel-connected electrode pairs. Such a cell module is capable of providing 456 watts of power based on an obtained power of 57 watts per electrode pair for electrodes having an area of about 400 square centimeters. For use in a hybrid vehicle, 120 of the modules shown are connected in series to provide an open-circuit voltage of 210 volts and an operating voltage of 156 volts at maximum load, to give a battery having 55 kilowatts of power. This power is obtained using individual electrodes having an area of 400 square centimeters and an obtained current density of 0.11 amps per square centimeter at 1.3 volts for a cell module having eight electrode pairs, thereby providing 458 watts per cell module. Such a zinc-nickel oxide battery assembly is capable of providing 55 kilowatts of power at power densities of 135 watts per pound and 5.3 watts per cubic inch, for a cycle life of many thousands of cycles under conditions of rapid cycling of the order of several seconds or minutes. Only approximately 300 cycles are now obtainable with the best of the conventional zinc-nickel oxide batteries and at considerably lower power densities.

The following examples, which are illustrative only and not to be construed as limiting the invention, describe the operation of a zinc-nickel oxide cell containing a rotatable shutter interposed between the electrodes.

EXAMPLE 1

A zinc-nickel oxide cell having a structure essentially similar to that shown in FIG. 1 was utilized. The electrodes and the shutter separator were of circular cross section and had a diameter of about 6 inches. The zinc electrode consisted of a cadmium-plated copper screen having a zinc layer electrodeposited thereon. The nickel oxide electrode was a conventional sintered-plaque electrode 27 mils thick and having a capacity of 4 ampere-hours. The electrolyte consisted of 250 ml of 35 wt percent KOH containing 6 g zinc oxide and 0.6 g $Na_2SnO_3 \cdot 3H_2O$. The last-named ingredient was found to promote the formation of a dense deposit of the electrodeposited zinc and also to reduce the self-discharge rate of the zinc electrode. The rotating shutter separator consisted of a thin nylon disk having three symmetrically disposed apertured sectors therein, the open area of the disk being about equal to that of the masked area.

The cell was operated for more than 500 cycles under varying conditions of charge and discharge. The shutter was rotated by a 56 rpm motor during most of the time. For the greater part of the period, charging was conducted at 8 amp (44 ma/cm$^2$) and discharge was at an average of 9 amp (50 ma/cm$^2$) to nearly complete discharge. A quantity of zinc equivalent to about 1.5 amp-hr was deposited during charge. The cell showed essentially no loss in capacity or voltage during the entire period.

After about 490 cycles, a 96 rpm motor was substituted with essentially no change in performance. However, when a lower speed 23 rpm motor was substituted, it was noted that for the particular shutter configuration used, a nonadherent zinc deposit was formed and the cell capacity dropped to a small fraction of its former value. Similarly, stopping the shutter rotation completely also destroyed the operability of the cell within a few cycles. In other experiments, a shutter was used having an open area of about 70 percent of the total area. The shutter was rotated at 96 rpm with good results being obtained. Again, stopping the rotation of the shutter destroyed the operability of the cell within a few cycles.

High power output was obtained with the cell, it being possible to deliver 16 amps (89 ma/cm$^2$) over a period of 5 minutes before the cell voltage dropped to 1.3 volts from an open-circuit voltage of about 1.75 volts. The average voltage was about 1.5 volts for this period (24 watts).

EXAMPLE 2

The cell shown in Example 1 was cycled by alternately charging and discharging it at a rate of 12 minutes at 4 amp, the shutter being rotated at 56 rpm. The cell was found capable of operation for more than 3,000 cycles. Periodically the cell was tested on discharge under high power output (18 amp) for a one-minute period. The cell voltage was 1.35–1.40 volts at the beginning and 1.25–1.3 volts at the end of the one-minute period. No significant change was observed in either the cycling performance level or the high-output performance level for the entire cycling period of the cell. It was found that where some depletion of the zinc concentration of the electrolyte occurred after continued cycling, this concentration level could be restored by discharging the cell at a 1.5 amp rate for about 90 minutes to remove the excess amount of zinc deposited on the zinc electrode. Regular cycling could be immediately resumed after completion of this special discharge cycle.

EXAMPLE 3

After the cell shown in Example 2 had completed 3,750 cycles, it was switched to a new duty cycle which simulated the cycling requirements for a hybrid automotive vehicle. This duty cycle involved extremely rapid cycling of about 42 seconds for the entire charge-discharge cycle, with repeated charge-discharge cycling at low to moderate current densities interspersed with periodic charge-discharge cycling at high current densities. Thus the cell provided 1.85 volts at a discharge rate of 2.5 amp (13 ma/cm$^2$) and 1.4 volts at 19 amp discharge (105 ma/cm$^2$). More than 25,000 such duty cycles have been completed with no change occurring in the high power output of the cell.

EXAMPLE 4

In another cycling run, a cell similar to that of Example 1 was designed for 20 watts maximum output. The cell was cycled in half-hour steps at 7 watts with occasional cycles at the maximum output. The charge-discharge cycle used was selected as typical of those to be expected in a typical hybrid vehicle application. The cell was operated without interruption in excess of 1,800 continuous charge-discharge cycles without degradation.

While the electrically regenerable electrochemical system of the present invention using a rotating apertured shutter is preferably utilized for electrically regenerable zinc-nickel oxide or zinc-air batteries, it may also be employed advantageously in other batteries and for other electrochemical applications. For example, where the negative electrode of the cell or battery is a zinc electrode, positive counterelectrodes that are more electropositive than zinc may be used in place of nickel oxide or oxygen, e.g., silver oxide, manganese dioxide, and mercuric oxide. Conversely, batteries may be made using any of these positive electrode materials wherein other negative electrode materials are utilized in place of zinc. It is only necessary that the positive electrode material selected be electrochemically reactive, compatible with the electrolyte, and more electronegative than the counterelectrode used. Such materials include lead, tin, iron, and cadmium for use in aqueous electrolytes, and aluminum and magnesium for use in nonaqueous electrolyte systems. From the standpoint of cost, capacity, and convenience, zinc is the preferred material for the negative electrode, and the improved battery of this invention using a rotating apertured shutter between the fixed negative and positive electrodes has been described therefore with reference to the use of a zinc negative electrode in conjunction with a nickel oxide counterelectrode.

The described cells will operate with conventional electrolytes, which include the alkaline materials such as sodium hydroxide, potassium hydroxide, mixtures of potassium and rubidium hydroxides, and the like. For certain applications, depending upon the nature of the electrode and counterelectrode materials, an acid electrolyte, including sulfuric and phosphoric acids, can also be employed.

It will of course be realized that the construction of the nonconductive movable shutter means disposed in the electrolyte between the negative and the positive electrodes may be widely varied depending upon the particular means utilized for moving the shutter means as well as the rate at which the shutter means is moved. However, the basic requirement for the shutter means is that it function so as to provide suitably stirring and circulation of the electrolyte and also provide a mechanical equivalent of pulsed charging. Thereby uniform and adherent deposits are formed in the electrodes. While the current take-off from the cell has not been shown other than schematically in the drawings, this may be any conventional means accessible by connection through the casing or to the tabs emerging from the casing. Such means will be readily apparent to those skilled in the art. It will thus be readily apparent that within the scope and spirit of the present inven-

I claim:

1. An electrically regenerable electrochemical system comprising spaced-apart negative and positive electrodes in cooperative relation with an electrolyte, and nonconductive movable shutter means having an open area of 30 to 80 per cent of the total area of the shutter means, said shutter means being disposed in said electrolyte between said negative and positive electrodes so that the continuous movement between said electrodes of the open and closed areas of said movable shutter means exposes at least a portion of a facing surface of at least one of said electrodes to alternating periods of maximum and minimum current density during operation of said system.

2. The electrochemical system according to claim 1 wherein the active material of said negative electrode is selected from lead, zinc, iron, cadmium and tin and at least a portion of a facing surface of said negative electrode is exposed to said alternating periods of maximum and minimum current density during operation of said system.

3. The electrochemical system according to claim 2 wherein the active material of said negative electrode is zinc and the active material of said positive electrode is nickel oxide.

4. The electrochemical system according to claim 1 wherein said shutter means comprises a rotatable apertured disk wherein the area of the open portion of the apertured disk constitutes between 30 and 80 per cent of the total disk area.

5. The electrochemical system according to claim 4 wherein the apertured disk is rotatable at a speed between 20 and and 200 rpm, an increasing apertured area being correlated with a decreasing speed of rotation so that the resultant alternating periods of maximum and minimum current density are between 20 and 200 cycles per second.

6. The electrochemical system according to claim 4 wherein the open portion of the apertured disk consists of from two to ten symmetrically disposed sectors.

7. The electrochemical system according to claim 6 wherein the active material of said negative electrode is zinc and the active material of said positive electrode is nickel oxide and said disk is disposed in cooperative relation with at least said negative electrode so that at least a portion of a facing surface thereof is exposed to said alternating periods of maximum and minimum current density during operation of said system to form adherent zinc deposits so that said system is capable of undergoing long cycle life at high power densities under conditions of rapid cycling.

* * * * *